United States Patent [19]

Kent

[11] 4,163,366
[45] Aug. 7, 1979

[54] APPARATUS FOR DISPOSAL OF LEAKING FLUIDS IN A TURBOFAN ENGINE

[75] Inventor: Peter Kent, Stratford, Conn.

[73] Assignee: Avco Corporation, Stratford, Conn.

[21] Appl. No.: 799,351

[22] Filed: May 23, 1977

[51] Int. Cl.² .................... F02K 3/04; F02K 11/04; F02C 7/30
[52] U.S. Cl. ...................... 60/226 R; 60/39.09 F; 60/39.66
[58] Field of Search ............... 60/226 R, 39.66, 39.75, 60/39.36, 271, 39.09 F, 266; 415/177, 178, 200

[56] References Cited

U.S. PATENT DOCUMENTS

| | | | |
|---|---|---|---|
| 2,434,901 | 1/1948 | Buck et al. | 415/178 |
| 2,579,114 | 12/1951 | Halford et al. | 60/266 |
| 2,591,676 | 4/1952 | Clayton | 60/266 |
| 2,853,854 | 9/1958 | Avery et al. | 60/39.66 |
| 3,058,302 | 10/1962 | Kuzyk | 60/39.66 |
| 3,151,841 | 10/1964 | Henny | 415/178 |
| 3,814,549 | 6/1974 | Cronstedt | 60/226 R |

FOREIGN PATENT DOCUMENTS 342040 12/1959 Switzerland ................... 415/177

OTHER PUBLICATIONS

"Aircraft Gas Turbine Engine", Pratt & Whitney Instruction Man., May, 1974, pp. 132-133.

Primary Examiner—Robert E. Garrett
Attorney, Agent, or Firm—Irwin P. Garfinkle; Robert J. McNair, Jr.; Ralph D. Gelling

[57] ABSTRACT

This invention relates to apparatus which harmlessly purges all fluids which leak from the fittings of a turbofan aircraft engine. Purging is achieved by passing a low speed flow of ventilating air along the exterior walls of the engine combustor section. This is accomplished by enshrouding the engine core with a cylindrical cowl. A space between the cowl and the engine combustor makes an annular shaped cavity. Ports in the cowl allow air to be brought into the cavity from the bypass ducting of the engine. The rapidly moving volume of air thus brought in vaporizes any fuel which leaks into the cavity. The vaporized air/fuel mixture is then exhausted into the hot gas plume emitted from the rear of the core engine.

4 Claims, 7 Drawing Figures

APPARATUS FOR DISPOSAL OF LEAKING FLUIDS IN A TURBOFAN ENGINE

BACKGROUND OF THE INVENTION

Leakage of fuel may take place in the combustor section of a gas turbine power plant. Leakage during engine starting may result from unburnt fuel being forced between joints which permit thermal expansion of combustor parts relative to one another. Leakage may also occur in the pipe joints which furnish fuel to the multiplicity of combustor nozzles. Fuel leakage from any source produces a risk of fire. The object of this invention is to reduce this risk.

Prior art systems of leakage fuel collection are disclosed in U.S. Pat. Nos. 3,556,444, 2,949,736 and 2,814,931. U.S. Pat. No. 3,556,444 to Kopp deals with means for handling leakage fluids in vertical takeoff and short takeoff aircraft wherein the entire engine is rotated to provide lift during landing and liftoff. Because of this change in engine attitude with respect to the gravity vector, Kopp was faced with finding a way to prevent the discharge of combustible fluids from the aft end of an engine during landing and takeoff. In U.S. Pat. No. 2,949,736, Rubbra discloses means for collecting the leakage fuel in a small sump positioned on the underside of the engine. Leakage fluids drain into the sump from between two rings used to provide a pressure seal for a thermal expansion joint in the compressor. Fuel collected in the sump is sucked into the jet pipe by a venturi pump unit which functions at engine speeds below rated rpm.

Johnson in U.S. Pat. No. 2,814,931 discloses means for collecting leakage fuels in a small tank located underneath the combustor section of an engine. The tank is supplied by a drain system which collects combustible fluids from such things as the valves, pumps and oil coolers associated with an engine. Believing it undesirable to purge the contents of the collector tank overboard, Johnson injects the leakage fluids into the stream of exhaust gas at a location just downstream of the combustor. A venturi pump is used, the pump unit being arranged to deliver the contents of the collector tank only during normal operation of the engine. During engine start up and shut down, valves act to close the outlet passage.

The three above identified patents disclose solutions for fuel leakage problems in jet turbine engines. My problem has different constraints in that my invention is pertinent to a fan-jet or turbofan engine. The turbofan engine includes a turboshaft engine which serves as a core engine to produce the power to drive the fan. In a suitable fan engine configuration the core engine is in the center of the fan airflow which is confined in an annular duct which must be streamlined to reduce aerodynamic losses. The inner wall of the annular fan duct also serves as a close-fitting shell or cowl around the core engine. Fuel leakage from the core engine and the associated piping will thus be within the confines of the cowl and must be disposed of in a manner to preclude its ignition within the cowl.

SUMMARY OF THE INVENTION

A main object of the invention is to prevent ignition of flammable fluids which may leak into the core engine compartment of a forward fan high-bypass turbine engine. The forward fan high-bypass engine incorporates a turboshaft core engine to provide the power to drive the fan. Extending forward from the core engine is the shaft which, through reduction gearing, drives a large diameter ducted fan. The fan rotates in an annular duct which has an intake for receiving atmospheric air. The airstream accelerated by the fan is divided. One part of the airstream (primary air) is fed to the core engine. The other part of the airstream (secondary air) bypasses the core engine through an annular duct which surrounds the core engine. In the turbofan engine in which my invention was embodied this portion of the airstream is ejected directly as a "non-mixed" exhaust. The object of the bypass system is to combine the good operating efficiency and high thrust capability of a turboprop and the high speed, high altitude capability of a turbojet while achieving lower fuel consumption.

The secondary airstream which bypasses the core engine unit must flow in a well-streamlined smooth duct to minimize aerodynamic losses. Thus, the inner wall of the annular fan duct is a smooth-surfaced cowl which encircles the core engine. This cowl not only serves to cover any irregularly shaped bulges resulting from core engine parts placement but also serves to control the velocity interface between the bypass airstream and the core engine exhaust gas. Since the cowl completely encircles the combustor section of the core engine, leakage fluids would be trapped between the core engine and the cowl unless provisions are made to get rid of them. My invention takes care of these leakage fluids in two ways.

First, for leaks which occur when the aircraft is parked on the flight line, a drain is incorporated in the bottommost part of the cowl. This prevents a puddle of flammable fluid from accumulating that could ignite at engine start-up.

Second, during operating conditions, ventilating air is ducted through openings in the cowl. This is readily accomplished since the core engine cowl also serves as the inner wall of the fan air duct. This allows fan air to be conveniently inducted by its dynamic pressure through a multiplicity of small cowl openings and into the cavity between the cowl and the core engine. This ventilating air flows axially aft over the core engine and discharges to the atmosphere at the aft end of the cowling. At engine holding power, the ventilation rate provides at least seventy changes of air in the bay per minute. The ventilating air represses the ignition of inadvertently leaking fuel or oil on hot engine surfaces, 22 changes of air per minute being adequate to prevent ignition on surfaces at temperatures as high as 850° F. during steady-state operation. The highest temperature attained by the combustor case in the system reduced to practice is 720° F. which appears adequately low with the provided ventilation to preclude ignition of leaking flammables on its surface.

DESCRIPTION OF THE ILLUSTRATED EMBODIMENT

Figure 1:
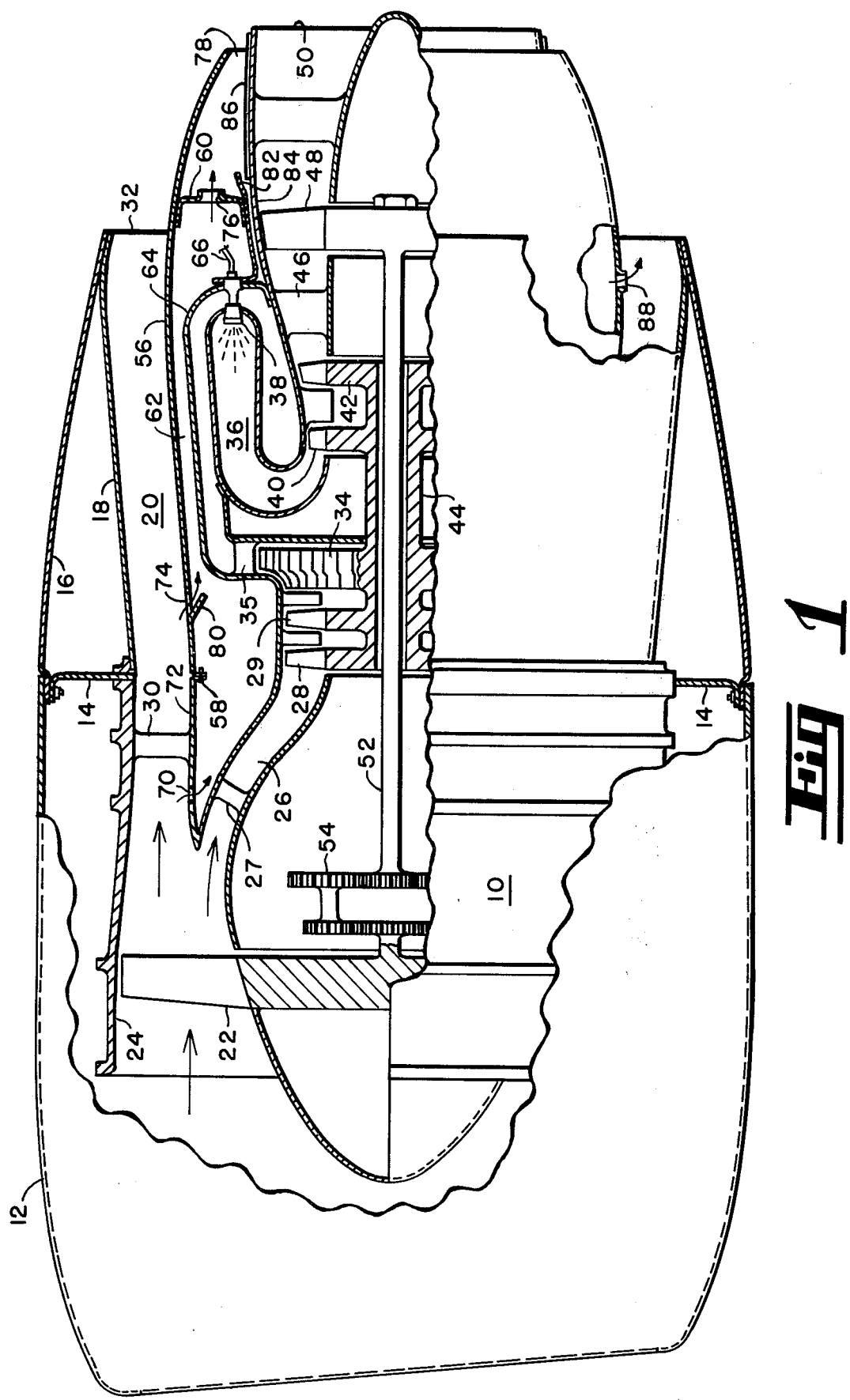
FIG. 1 is a cross-sectional view of a turbofan engine with partial cutaways showing the gas producer section surrounded by a ventilating arrangement including a cowl which separates the core engine from the bypass airstream.

For propulsion an aircraft will have mounted thereon one or more turbofan engines 10. As shown in FIG. 1, turbofan engine 10 is coaxially arranged in nacelle 12. Brackets 14 connect engine 10 to nacelle 12. Aft portions 16 and 18 of nacelle 12 serve respectively as an outer fairing and the outer wall of the annular bypass air duct 20.

Turbofan engine 10, shown in cutaway view in FIG. 1, is typical of high bypass ratio units having a single front-mounted ducted fan stage 22. Fan stage 22 rotates in annular duct 24 which is a continuation of the air intake. The stream of air accelerated by fan stage 22 is divided. "Primary" air enters passageway 26 passing around fixed guide vanes 27 and flowing on into compressor stages 28 and 29. "Secondary" air passes over fixed guide vanes 30, through annular bypass duct 20 and eventually discharges at nozzle 32 as a cold gas stream.

In the FIG. 1 arrangement, fan stage 22 supercharges compressor stages 28 and 29. Air from compressor stage 29 is forced radially outward by impeller blades 34 so as to pass through diffuser 35. High pressure air from diffuser 35 flows through orifices into combustor 36. Fuel enters combustor 36 through nozzles 38. The hot gases from the combustor drive turbine blade stages 40 and 42. Power absorbed from the hot gas stream by turbine stages 40 and 42 is used to drive the compressor stages via tubular shaft 44.

Hot gases leaving turbine stage 42 pass through fixed guide vanes 46 and on into turbine stage 48. Power absorbed by turbine stage 48 serves to drive input fan stage 22 via shaft 52 and reduction gearing 54. Hot gases leaving turbine stage 48, and exiting at tailpipe 50, provide a small portion of overall engine thrust.

Surrounding the core engine is a generally cylindrical cowl 56 which serves as the inner wall of fan air duct 20. Cowl 56 is held axially symmetric with the core engine by means of bolts 58 and bulkhead spacer ring 60. The cross-sectional diameter of cowl 56 is such that an annular shaped cavity 62 is formed between the inside of cowl 56 and outer wall 64 of the core engine.

Most fuel leakage will occur around the fittings which connect fuel lines to combustor 36. One of these is shown as fuel line fitting 66. It will be understood that there are a multiplicity of fuel line fittings 66 and fuel nozzles 38 around the circumference of the core engine. Due to the large number of pipe joints and fuel line fittings in the area of nozzles 38, leakage of fluids will most likely occur in the compartment surrounding the junction between outer wall 64 and the fuel line distribution system represented in FIG. 1 by fitting 66.

Ventilation is used to purge out and repress ignition of flammable fluids and vapor which might leak into the above mentioned compartment surrounding fittings 66. Additionally, shielding is employed around the hottest engine casings to provide lowered surface temperatures.

Ventilation is achieved as follows. First, there are a multiplicity of ventilation holes 70 distributed between and forward of struts 30 of engine frame 72. Holes 70 admit air from fan duct 20 to ventilate the forward portion of the bay between the core engine and the inner wall of fan duct 20.

Figure 2:
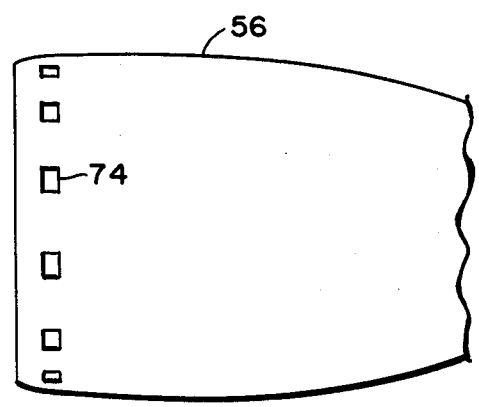
FIG. 2 is a partial top view of the cowl which surrounds the core engine showing the rectangular inlet ports through which ventilating air is inducted from the bypass stream.

Secondly, ventilation inlet ports 74 are provided to admit air from fan duct 20 to the annular space 62 between the core engine outer wall 64 and cowl 56. Ventilation inlet ports 74 are located as far forward as practical in cowl 56. FIG. 2 shows more details of the manner in which inlet ports 74 are spaced around the front edge of cowl 56.

The combined air entering through ventilation holes 70 and inlet ports 74 sweep out any flammable vapors which might tend to collect within the confines of cowl 56. Ignition of flammable liquids dripping on hot engine surfaces is suppressed. The ventilating air flows aft under cowl 56, passes through orifices 76 in bulkhead spacer ring 60, and exits through annular gap 78 between the end of cowl 56 and core engine exhaust nozzle 50. In the unit reduced to practice annular gap 78 had a cross-sectional area which exceeded 22 square inches, an area found sufficient to avoid overpressure in the cowl during operation of the turbofan engine.

Figure 5:
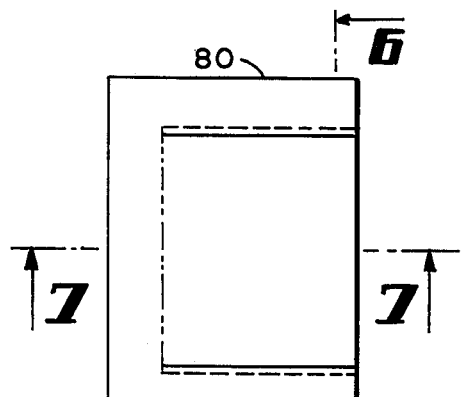
FIG. 5 is a cowl-side view of one of the air inlet ramps attached to the underside of the rectangular inlet ports made in the cowl shown in FIG. 2.
Figure 6:
FIG. 6 is a right side view of the inlet ramp taken along line 6—6 of FIG. 5.
Figure 7:
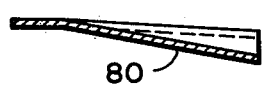
FIG. 7 is a front side view of the inlet ramp taken along line 7—7 of FIG. 5.
Figure 3:
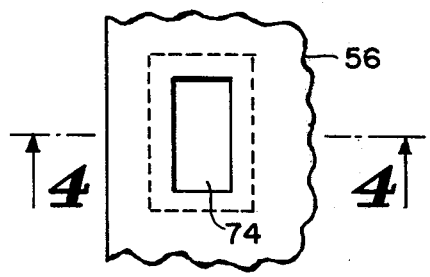
FIG. 3 is an enlarged view of one of the ports shown in FIG. 2.
Figure 4:
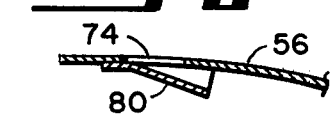
FIG. 4 is a cross-sectional view of the inlet port taken along line 4—4 of FIG. 3.

FIGS. 2 through 7 show details of a ventilation inlet configuration that was found satisfactory in practice. As depicted in FIG. 2, twelve equal size, equally spaced, rectangular inlet ports 74 were formed in cowl 56. The inlets, in the unit reduced to practice, were flush with the surface of the fan duct channel. Negative ramps 80 (See FIG. 4) induce fan air into the annular space 62 positioned immediately aft of the inlets 74 (see FIG. 1). In the unit reduced to practice, each of the inlets 74 had a cross-sectional area of approximately 5 square inches. FIGS. 5, 6 and 7 show how ramp 80 can be stamped from a piece of sheet metal. Attachment of ramp 80 to the inner surface of cowl 56 can be by any conventional means, for example, spot welding.

Now as visualizable in FIG. 1, there will under operating conditions, be a flow of ventilating air brought in through holes 70 and ports 74. This flow of air is sufficient at rated engine speed to bring about no less than seventy changes of air per minute in the space between the core engine and engine cowl 56. The placement of bulkhead spacer disc 60 just aft of the area containing the fuel lines (see fitting 66) causes the ventilating air to assume turbulent flow conditions in the cavity containing the fuel lines. The turbulent air conditions help to vaporize the leakage fluids. A series of equally spaced orifices 76 allows the potentially flammable vapors to exit through bulkhead spacer disc 60.

A cylindrical shield 82 formed from stainless steel or other applicable material is positioned between bulkhead spacer disc 60 and the core engine casing 84. Shield 82 extends forwardly over that part of engine casing 84 which surrounds turbine stage 48. An air gap between shield 82 and casing 84 helps to moderate the temperature of the metal onto which flammable liquids might drip. Inadvertent leakage from fuel lines or distribution manifolds will evaporate rather than bursting into flame on striking shield 82. Additional shielding 86 is also provided over the tailpipe end of casing 84. Shielding 86 might, for example, consist of an asbestos blanket covered with sheet metal.

To prevent a puddle of flammable liquid from accumulating within engine cowl 56 when the aircraft is parked, a drain hole 88 is provided. Drain hole 88 is located at the lowest point in cowl 56. Leaking fluids pass through drain hole 88 and into the path of the bypass or "secondary" airstream. Drain hole 88 thus prevents collection of any flammables which might be ignited on engine startup.

The vaporized leakage fluid particles entrained in the ventilating air exits through annular gap 78. Gap 78 is at the confluence of the "secondary" and "primary" flow streams. Gases emitted from tailpipe 50 are hot enough to cause the vaporized leakage fluid particles either to become oxidized or to undergo a chemical dissociation so that the hydrocarbons are broken down into carbon particles and aromatics. In any case, my invention prevents the ignition of flammable liquids within the confines of cavity surrounding the combustor casing of the core engine.

Although a preferred embodiment of the invention has been described in detail, it is to be understood that various changes, substitutions and alterations can be made without departing from the spirit and scope of the invention. For example, inlet ports 74 have been shown as being coupled with a negative directed ramp 80. In implementing this invention on some engines it may be required to obtain a higher pressure at the ventilation inlets to produce an adequate flow of air. Forward facing scoops may then be required to direct an adequate quantity of air into the interior of the engine cowl. Also, the configuration of bulkhead 60 and shield 82 may have to be varied to accommodate changes in core engine design. Additionally, implementation of the invention on some engines may require employment of additional shielding around other hot engine casings to reduce surface temperatures below the ignition point. All such changes are considered to be within the scope of my invention.

I claim:

1. In combination with a turbofan engine having a leaking fluid disposal apparatus of the type wherein ventilating air from the bypass ducting is drawn through ports in the cowl separating the bypass ducting and the core engine stages, the cowl having at its midsection in the area containing the engine fuel lines, a diameter sufficient to form between said cowl and said core engine stages an annular shaped cavity through which said ventilating air flows, and wherein means are included for exhausting the combination of ventilating air and vaporized leakage fluids into the confluence of the bypass airstream and the gases emitted from the tailpipe of said core engine stages, the improvement which comprises:

turbulent flow inducing means for directing the flow of ventilating air being brought through said ports in said cowl into all cavities around the exterior of said core engine stages, said turbulent flow of air causing vaporization of all leaking fluids, said turbulent flow inducing means including (a) a bulkhead spacer disc of annular configuration positioned just aft of said engine fuel lines and having its outer periphery attached to the inner wall of said cowl, said spacer disc having a multiplicity of orifices therethrough for allowing passage of ventilating air, and (b) a cylindrical metallic shield attached at one of its ends to the inner edge of said bulkhead spacer disc, said shield encircling the hot core engine stages aft of said fuel lines and serving to prevent leaking fluids from striking surfaces of said core engine stages which are above the ignition temperature of said leaking liquids, the combination of said shield and said disc serving to cause rapid vaporization of leaking liquids during operation of said turbofan engine.

2. The invention as defined in claim 1 including means for admitting air from said bypass ducting to ventilate the forward portion of the bay between the core engine and the inner wall of said bypass ducting.

3. The invention as defined in claim 2 wherein the combined flow of ventilating air brought in from the bypass duct is sufficient to bring about no less than seventy changes of air per minute in the space between said core engine and said cowl when said turbofan engine is operating at rated speed.

4. The invention as defined in claim 1, including drain means in the lowermost section of said cowl for preventing accumulation of pools of flammable liquids which leak from said core engine during non-operating intervals.

* * * * *